US007376050B2

(12) United States Patent
Yanase

(10) Patent No.: US 7,376,050 B2
(45) Date of Patent: May 20, 2008

(54) ELECTRONIC MUSICAL APPARATUS HAVING VOLATILE INTERNAL CLOCK TO BE CORRECTED BY EXTERNAL CLOCK AND COMPUTER PROGRAM THEREFOR

(75) Inventor: Tsutomu Yanase, Hamamatsu (JP)

(73) Assignee: Yamaha Corporation (JP)

( * ) Notice: Subject to any disclaimer, the term of this patent is extended or adjusted under 35 U.S.C. 154(b) by 396 days.

(21) Appl. No.: 11/000,648

(22) Filed: Dec. 1, 2004

(65) Prior Publication Data

US 2005/0122841 A1 Jun. 9, 2005

(30) Foreign Application Priority Data

Dec. 5, 2003 (JP) ............................ 2003-407037

(51) Int. Cl.

*G04B 47/00* (2006.01)
*G04C 11/02* (2006.01)
*G04C 21/00* (2006.01)
*G10H 7/00* (2006.01)
*H04M 11/00* (2006.01)

(52) U.S. Cl. ............................ 368/10; 368/12; 368/47; 368/73; 84/645; 455/408

(58) Field of Classification Search .................. 368/10, 368/11, 46, 47, 72–74; 84/645; 455/408
See application file for complete search history.

(56) References Cited

U.S. PATENT DOCUMENTS 6,678,215 B1 * 1/2004 Treyz et al. .................. 368/10
6,747,920 B2 * 6/2004 Denda et al. .............. 369/30.9

(Continued)

FOREIGN PATENT DOCUMENTS

JP 56-7989 A 1/1981

(Continued)

OTHER PUBLICATIONS

Notification of Reasons for Refusal issued for corresponding Japanese Patent Application No. 2003-407037, with date Feb. 27, 2007.

*Primary Examiner*—Vit W Miska
(74) *Attorney, Agent, or Firm*—Rossi, Kimms & McDowell LLP

(57) ABSTRACT

An electronic musical apparatus is of a data processing type which boots up when a power is supplied and shuts down when the power is removed. The apparatus comprises an internal clock which is not backed up by an uninterruptible power supply and stops counting time when the power supply to the apparatus is shut down. Upon boot of the apparatus or as preparation for execution of processing which needs a reference time-of-day clock counting, the apparatus acquires time-of-day clock counting information, and corrects the internal clock to run with the time-of-day counting based on the time-of-day information acquired externally, so that the apparatus can execute processing which needs a reference time-of-day clock counting, even though it is not equipped with a backup power supply for the internal clock. In case the acquisition of time-of-day information has not been successful, the execution of such processing will be prohibited, or the internal clock may be corrected based on a default time-of-day or on a user-set time-of-day.

13 Claims, 5 Drawing Sheets

Network System Configuration
for Acquiring Time-of-Day

U.S. PATENT DOCUMENTS

| | | | | |
|---|---|---|---|---|
| 7,146,559 | B2 * | 12/2006 | Sakuma | 714/814 |
| 2001/0004397 | A1 * | 6/2001 | Kita et al. | 381/334 |
| 2002/0160749 | A1 * | 10/2002 | Nishikawa | 455/408 |
| 2003/0055789 | A1 * | 3/2003 | Sakuma et al. | 705/52 |
| 2003/0105890 | A1 | 6/2003 | Sakuma | |
| 2003/0120604 | A1 * | 6/2003 | Yokota et al. | 705/57 |
| 2003/0219039 | A1 | 11/2003 | Oguchi | |

FOREIGN PATENT DOCUMENTS

| | | |
|---|---|---|
| JP | 2003-167788 A | 6/2003 |
| JP | 2004-003928 A | 1/2004 |

* cited by examiner

Hardware Configuration of Electronic Musical Apparatus

*Fig. 2* Network System Configuration for Acquiring Time-of-Day
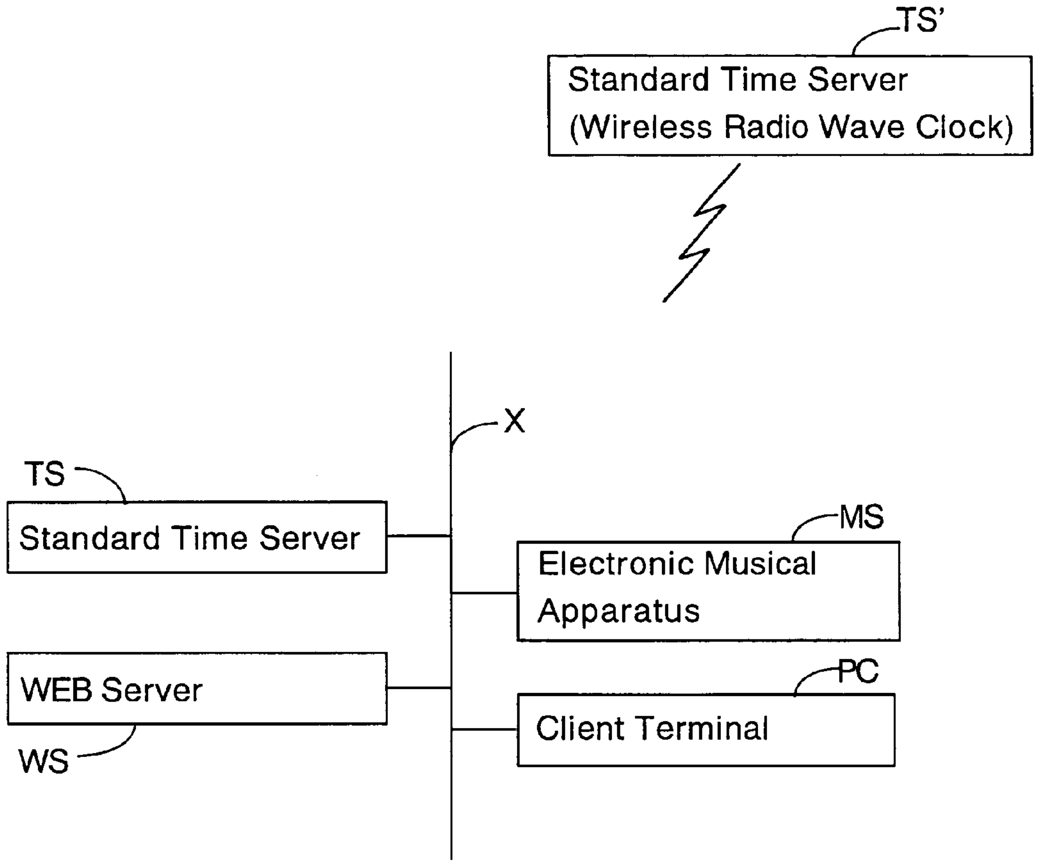

*Fig. 3a* Time-of-Day Acquiring Processing (Part 1)
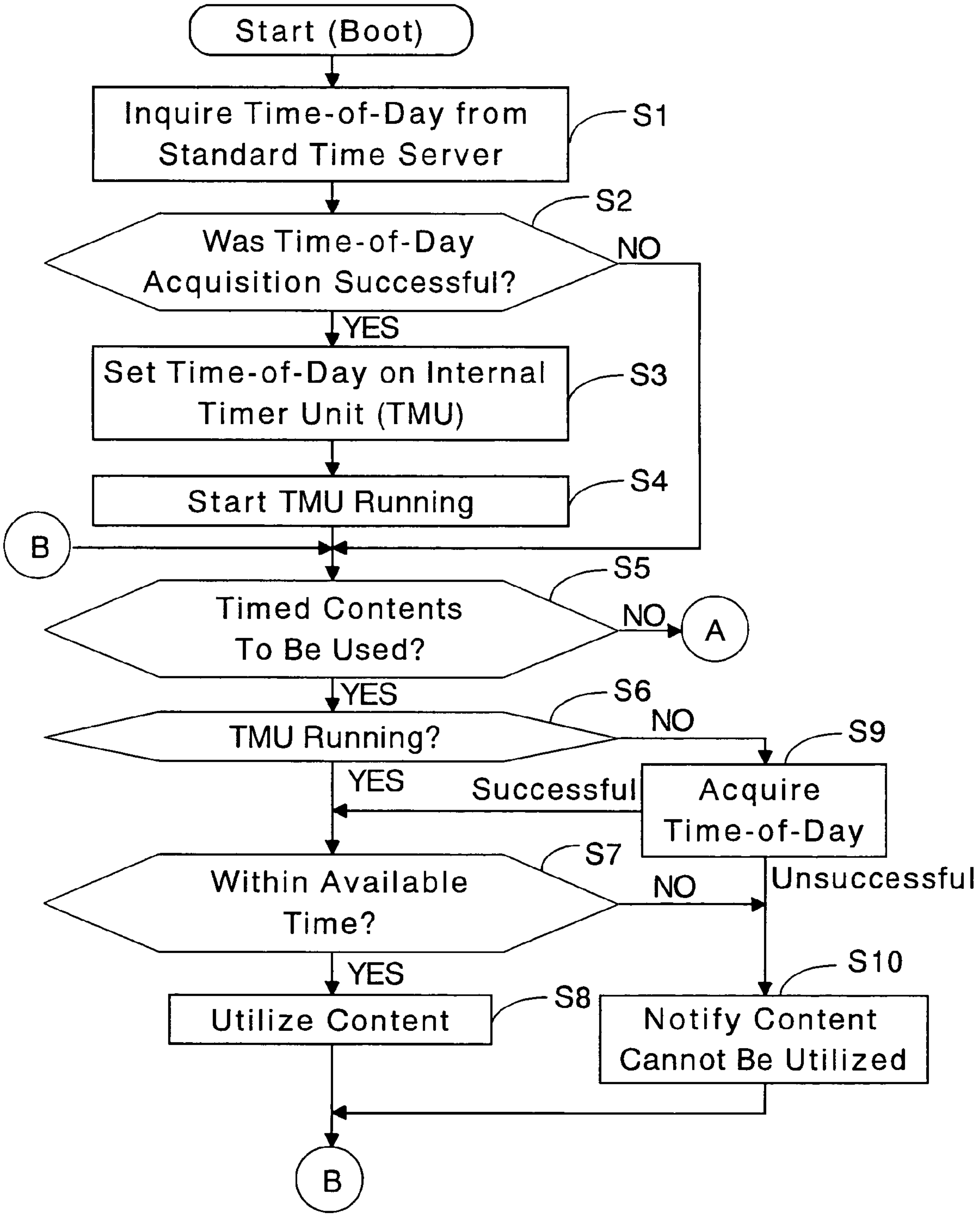

*Fig. 3b* Time-of-Day Acquiring Processing (Part 2)
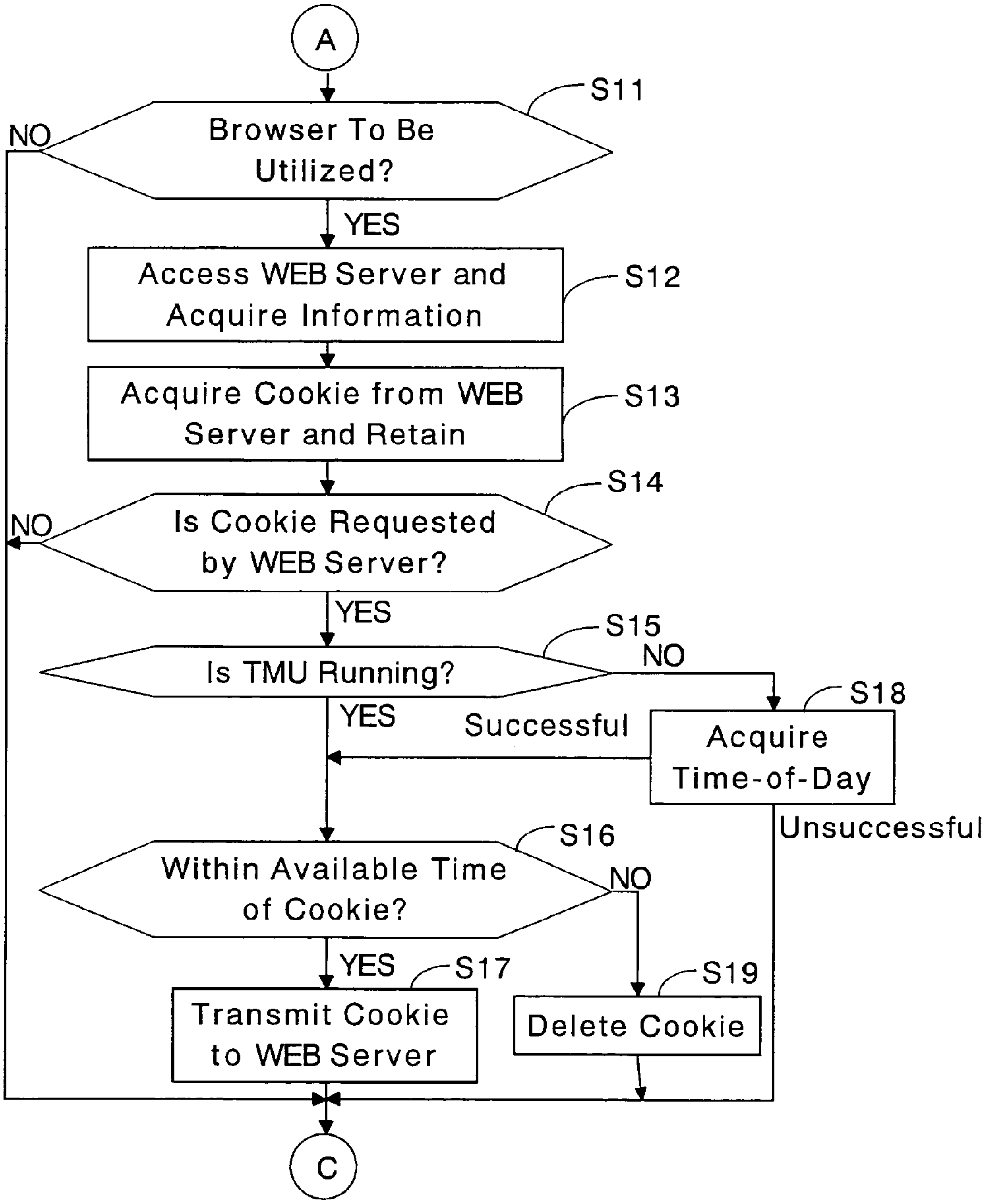

*Fig. 3c* Time-of-Day Acquiring Processing (Part 3)
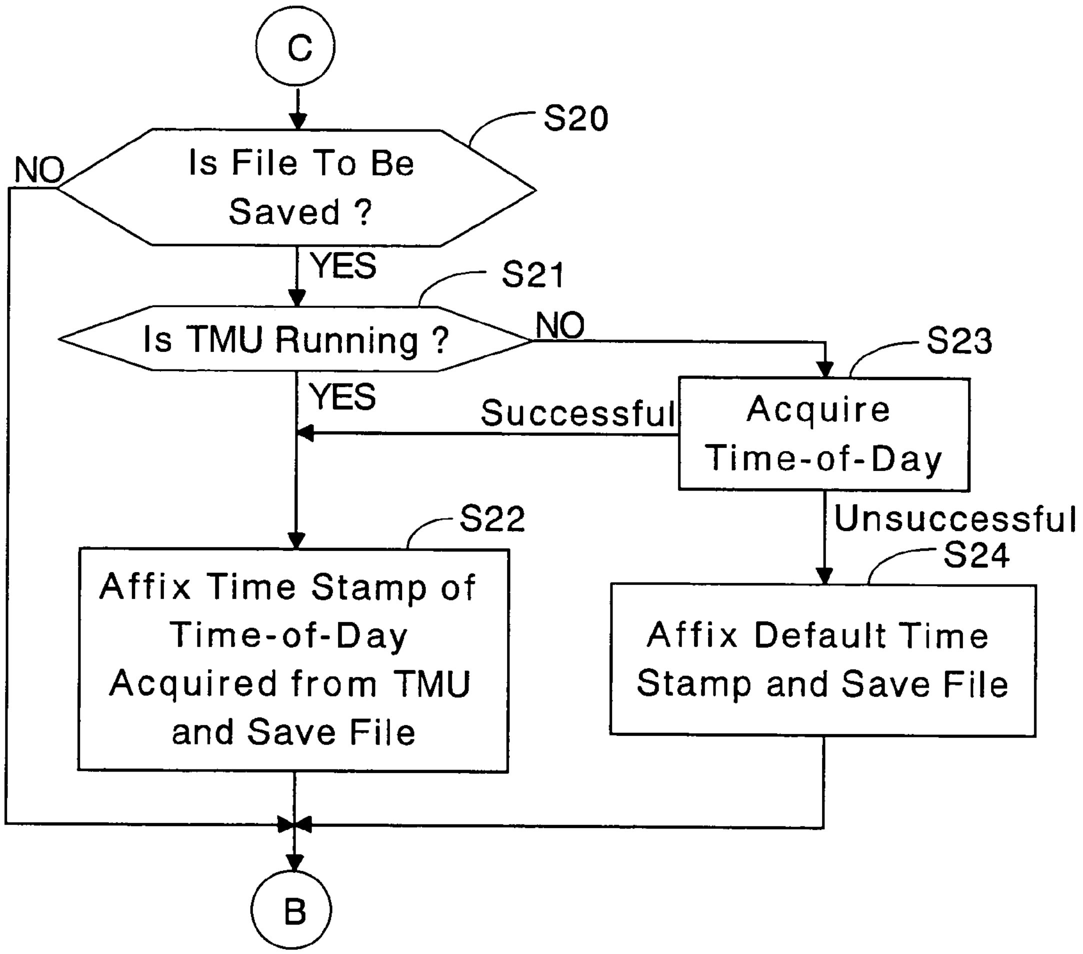

ELECTRONIC MUSICAL APPARATUS HAVING VOLATILE INTERNAL CLOCK TO BE CORRECTED BY EXTERNAL CLOCK AND COMPUTER PROGRAM THEREFOR

TECHNICAL FIELD

The present invention relates to an electronic musical apparatus having a volatile internal clock to be corrected by an external clock and a computer program therefor, and more particularly to an electronic musical apparatus of a data processing type which operates with reference to an internal clock and a computer program therefor, in which the internal clock is not backed up by an uninterruptible power supply but is to be automatically corrected according to a standard time acquired from an external standard time server so that any processing that needs reference time containing time of day information should be executed along with the information about the time of the day based on the internal clock.

BACKGROUND INFORMATION

Various types of musical apparatuses including an internal clock are known in the art, which execute various data processing such as processing of musical contents which need reference time containing time-of-day information, by using the time-of-day counting provided by the internal clock. An example of such musical apparatuses is disclosed in unexamined Japanese utility model publication No. S56-007989, in which a so-called automatic rhythm performance control device executes processing of musical contents to automatically generate predetermined rhythm tones by comparing the previously set time-of-day with the running time-of-day on the internal clock equipped therein and starting the rhythm performance tones at the intended (i.e. the previously set) time-of-day, for example, so that the apparatus may work as an alarm clock. According to the recent progress of the communication networks, wired and wireless, such as Internet, there are some data processing terminals which receive standard time-of-day information from an external standard time server via a communication network and correct the internal clock by such external standard time-of-day information to keep the internal clock running with the correct time-of-day counting.

With a conventional musical apparatus or terminal device having an internal clock therein, however, the internal clock needs a back up power supply such as a battery or a capacitor so that the internal clock will be kept running with correct time-of-day clock counting. In other words, the internal clock keeps good time-of-day counting as long as the apparatus or the terminal device is connected to an external power supply such as a service power outlet so that the internal clock is driven by the supplied power, whereas the internal clock cannot keep time-of-day counting when the apparatus or the terminal device is disconnected from the external power supply and the internal clock is no longer driven by a power. In order to overcome such an inconvenience, most of the apparatuses and the terminal devices have a backup power supply for the internal clock so that the internal clock can keep running correctly while the apparatus or the terminal device is disconnected from the external power supply. Considering that the apparatus or the terminal is usually connected to an external power supply when it is used to execute processing which needs reference time-of-day clock counts, it will be a kind of waste to provide a backup power source only for the internal clock to keep time-of-day counting during the absence of an external power supply to the apparatus or the terminal device. The provision of such a backup power source, on the other hand, will increase the size and the weight, and consequently the cost, of the apparatus or the terminal device, which will be a disadvantageous problem in connection with the conventional apparatus and terminal device.

SUMMARY OF THE INVENTION

It is, therefore, a primary object of the present invention to solve the drawbacks with the conventional apparatus, and to provide a novel type of electronic musical apparatus and a computer program incorporating a volatile internal clock which is to be corrected by an external clock so that the apparatus can execute various processing that needs a standard reference time-of-day clock counting based on the internal clock counting, even though the apparatus is not provided with a backup power source for the internal clock. The apparatus is so arranged as to acquire from an external standard time server the correct time-of-day information at the time the electronic musical apparatus boots up or starts execution of processing which needs a time-of-day clock counting, and to set and start the internal clock running according to the externally acquired standard time-of-day information, so that the processing will be conducted along with the time-of-day clock counting internally.

According to the present invention, the object is accomplished by providing an electronic musical apparatus of a type which boots up when a power is supplied and shuts down when the power is removed, the apparatus comprising: an internal clock which is not backed up by an uninterruptible power supply and stops counting time when a power supply to the apparatus is shut down; a time information acquiring device which externally acquires time-of-day clock counting information upon boot of the apparatus or prior to execution of processing which needs a reference time-of-day clock counting; a clock correcting device which corrects the internal clock to run with a time-of-day counting based on the time-of-day information acquired externally; and a process executing device which executes processing which needs a reference time-of-day clock counting according to the time-of-day counting of the internal clock as corrected by the clock correcting device; whereby the apparatus is capable of executing processing which needs a reference time-of-day clock counting, even though the apparatus is not equipped with a backup power source for the internal clock.

Thus, with an electronic musical apparatus which is not provided with a backup power supply for the internal clock, the internal clock can progress in a correct time-of-day counting when the apparatus executes processing which requires time-of-day information, by acquiring time-of-day information from an external time server and adjusting the internal clock based on the acquired correct time-of-day information when the apparatus is booted up or is going to execute processing which needs a time-of-day counting information.

In an aspect of the present invention, the time information acquiring device may acquire the time-of-day clock counting information from an external time server which transmits a reference time-of-day clock counting via a wired or wireless communication.

In another aspect of the present invention, the apparatus may further comprise a judging device which judges, before the process executing device executes processing which needs a reference time-of-day clock counting, whether the time information acquiring device has successfully acquired the time-of-day clock counting information, and prohibits the process executing device from executing processing which needs a reference time-of-day clock counting, when the time-of-day clock counting information has not been successfully acquired.

In still another aspect of the present invention, the apparatus further comprise a judging device which judges, before the process executing device executes processing which needs a reference time-of-day clock counting, whether said time information acquiring device has successfully acquired the time-of-day clock counting information, and controls the clock correcting device to correct the internal clock to run based on a prepared default time-of-day or a user-set time-of-day arbitrarily set by a user, when the time-of-day clock counting information has not been successfully acquired.

In still another aspect of the present invention, the processing which needs a reference time-of-day clock counting may be processing which utilizes a timed content or which utilizes a browser or which saves a file.

In still another aspect of the present invention, the apparatus may further comprise a storing device which stores a content to be utilized by the apparatus, wherein the process executing device utilizes the content as stored in the storing device, along with using the internal clock counting. The content may be a timed content.

In still another aspect of the present invention, the apparatus may further comprise a storing device which stores a browsing program, wherein the process executing device executes the browsing program as stored in the storing device, along with using the internal clock, to acquire timed data having a time limit of use via a communication network. The process executing device may compare the time limit of data acquired via the communication network while the browsing program is being executed, and may process the timed data in accordance with the result of the comparison while the browsing program is being executed.

In still another aspect of the present invention, the process executing device may save a file with a time-of-day stamp affixed to the file, wherein the time of day is indicated by the internal clock.

According to the present invention, the object is further accomplished by providing a storage medium for use in an electronic musical apparatus having a volatile internal clock, the apparatus being of a data processing type comprising a processor and being connectable to a communication network including a time server, the medium containing a set of executable instructions for causing, upon boot of the apparatus or prior to execution of processing which needs a reference time-of-day clock counting, the processor to perform the steps of: acquiring time-of-day information externally from the time server through the communication network; correcting the internal clock to run with a time-of-day counting based on the time of day information acquired externally; and executing the processing which needs a reference time-of-day clock counting based on the corrected time-of-day counting of the internal clock.

According to the present invention, the object is still further accomplished by providing a storage medium for use in an electronic musical apparatus having a volatile internal clock, the apparatus being of a data processing type comprising a processor and being connectable to a communication network including a time server, the medium containing a set of executable instructions for causing, at latest prior to execution of processing which needs a reference time-of-day clock counting, the processor to perform the steps of: acquiring time-of-day information externally from the time server through the communication network; judging whether the time-of-day information has been successfully acquired; correcting the internal clock to run based on a prepared default time-of-day or a user-set time-of-day set by a user; and executing the processing which needs a reference time-of-day clock counting based on the corrected time-of-day counting of the internal clock.

As is apparent from the above description, the present invention can be practiced not only in the form of an apparatus, but also in the form of a computer program to operate a computer or other data processors such as a DSP. The invention can further be practiced in the form of a method including the steps mentioned herein.

In addition, as will be apparent from the description herein later, some of the structural element devices of the present invention are structured by means of hardware circuits, while some are configured by a computer system performing the assigned functions according to the associated programs. The former may of course be configured by a computer system and the latter may of course be hardware structured discrete devices. Therefore, a hardware-structured device performing a certain function and a computer-configured arrangement performing the same function should be considered a same-named device or an equivalent to the other.

BRIEF DESCRIPTION OF THE DRAWINGS

For a better understanding of the present invention, and to show how the same may be practiced and will work, reference will now be made, by way of example, to the accompanying drawings, in which:

FIG. 2 is a block diagram illustrating an example of the overall configuration of a communication network system to which the electronic musical apparatus of FIG. 1 is connected in order to acquire standard time-of-day information from an external standard time server; and FIGS. 3*a*, 3*b* and 3*c* are, in combination, a flow chart describing an example of the standard time-of-day information acquiring processing according to the present invention.

DETAILED DESCRIPTION OF EMBODIMENTS OF THE INVENTION

Figure 1:
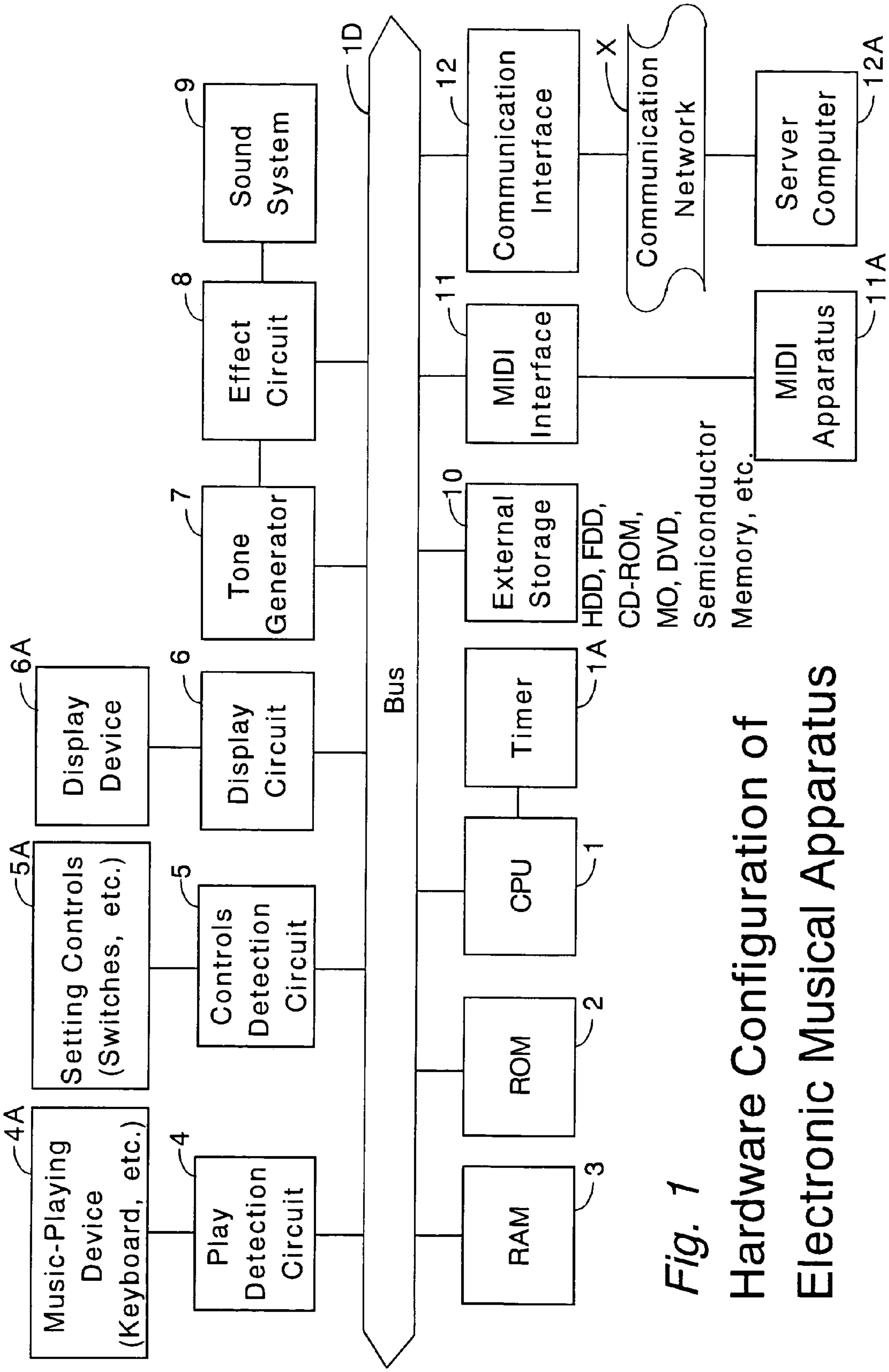
FIG. 1 is a block diagram illustrating the overall hardware configuration of an electronic musical apparatus embodying an internal clock correcting arrangement according to the present invention.

Herein below will be described an embodiment of the present invention with reference to accompanying drawings. FIG. 1 shows a block diagram illustrating the overall hardware configuration of an electronic musical apparatus embodying an internal clock correcting arrangement according to the present invention. The electronic musical apparatus is a dedicated electronic apparatus for handling musical signals such as an electronic musical instrument, a tone generating device, a sequencer, an effector and a mixer. The electronic musical apparatus of the present invention, however, is of a type which is not equipped with a backup power source (e.g. a battery or a capacitor) for retaining time-of-day information. There can be various reasons for non-equipment, but the primary object may be to cut down the cost of the apparatus. The “time of day” information may contain information about not only the time (hour, minute, and second) but also the date (year, month, and day of month).

In the present embodiment, the electronic musical apparatus are controlled by a microcomputer comprising a microprocessor unit (CPU) 1, a read-only memory (ROM) 2 and a random-access memory (RAM) 3. The CPU 1 controls the overall operations of the electronic musical apparatus. To the CPU 1 are connected the ROM 2, the RAM 3, a play detection circuit 4, a controls detection circuit 5, a display circuit 6, a tone generator 7, an effect circuit 8, an external storage device 10, a MIDI interface 11 and a communication interface 12 via data and address buses 1D. Further to the CPU 1 is connected a timer 1A which counts various times including interrupt times for timer interrupt processing. For example, the timer 1A generates a clock pulse, and supplies the generated clock pulse to the CPU 1 as process timing instructions or as interrupt instructions. CPU 1 conducts various processing according to these instructions. In addition to the function of controlling the CPU 1, the timer 1A performs a function of measuring (or counting) times according to the generated clock pulse. The timer 1A which operates as an internal clock as mentioned above is herein referred to as a timer unit (TMU). The timer unit (TMU) may be of a hardware type like the abovementioned timer 1A (the one which is incorporated in the CPU, etc. or the one which is a dedicated clock separate from the CPU) or may be of a software type constituted by a microprogram and hardware resources such as a CPU and a RAM.

The ROM 2 stores various control programs to be executed and various data referenced by the CPU 1. The RAM 3 is used as a working memory which temporarily stores various data processed or produced while the CPU 1 executes the programs, and a memory which stores the currently running programs and the associated data. The predetermined address areas of the RAM 3 are allotted for respective functions, and are used for registers, flags, tables, memories, etc. To the play detection circuit 4 is connected a music-playing device 4A, which is such a device as a keyboard comprising a plurality of music-playing keys for selecting notes in playing music, each key having a key switch for the detection of the manipulation thereof. The music-playing device (such as a keyboard) 4A is, of course, used for the manual playing of music by the user, and can additionally be used for inputting other control commands for setting music playing environments in the apparatus. The play detection circuit 4 detects the depressions and the releases of the respective controls (keys) in the music-playing device 4A, and provides the detected outputs.

To the controls detection circuits 5 are connected setting controls 5A, which are those such as switches for inputting various and information with respect to playing music. For example, the switches are of selecting performance data to be used for a music performance and of setting music playing environment including the tempo of the playing. Other than these, the setting controls 5A may include a ten-key pad buttons for inputting numerical data used in selecting, setting and controlling the note pitch, the timbre (tone color), the effect, etc., and a typewriter keyboard for inputting character data, and a mouse device for controlling the pointer exhibited on the display device 6A. The controls detection circuit 5 detects the manipulated conditions of those switches, and outputs switch information representing the manipulated conditions to the CPU 1 via the data and address bus 1D. The display circuit 6 is to display various information relating to the music performance and the control conditions of the CPU 1 on the display device 6A configured by, for example, a liquid crystal display (LCD) panel or a cathode ray tube (CRT). The user can select, input or set the environmental conditions for the musical performance with reference to the various information displayed on the display device 6A.

The tone generator 7 is of a multi-channel processing type and is capable of generating plural tone signals simultaneously, and receives the various music playing information generated according to the user's manipulation of the music-playing device 4A or the music performance data via the data and address bus 1D control manipulation signals automatic music playing data via the bus 1D to generate musical tone signals based on such received music playing information. The musical tone signals generated by the tone generator 7 are passed through the effect circuit 8 to be modified with tone effects, and the modified tone signals are supplied to a sound system 9 which includes an amplifier and a loudspeaker to be emitted as audible sounds. Although not specifically shown in FIG. 1, the effect circuit 8 may include a plurality of effect imparting units, each of which will imparts an allotted tone effect to the musical tone signals from the tone generator circuit 7 according to the effect determining parameters as set by the user.

The external storage device 10 is to store various data including music playing data and waveform data, and controlling data for controlling the various programs to be executed by the CPU 1. In the case where the ROM 2 does not store the control programs, such control programs may be stored in the external storage device 10 (for example, a hard disk) 4 and may be transferred to the RAM 3 so that the CPU 1 can operate in the same way as the case where the ROM 2 stores the control programs. This situation will be rather advantageous in that the control programs can be easily added or up-graded. The storage device 10 may not necessarily be a hard disk (HD) device, but may also be any type of storage device using any of various detachable external storage media such as a flexible disk (FD), a compact disk (CD-ROM, or CD-RAM), a magneto-optical (MO) disk or a digital versatile disk (DVD). Alternatively, the storage device 10 may be a semiconductor memory such as a flash memory.

The MIDI interface 11 is an interface for inputting musical performance data in the MIDI format from an externally connected MIDI apparatus to this electronic musical apparatus and for outputting musical performance data in the MIDI format from this electronic musical apparatus to another MIDI apparatus 11A.

The communication 12 is connected to a communication network X which may be a wired or wireless network such as an LAN, Internet, and a telephone line so that the electronic musical apparatus can be connected to a server computer 12A via the communication network X to download control programs and various data from the server computer 12A into the electronic musical apparatus. Namely, in the case where the necessary control programs are not stored in the ROM 2 or in the external storage device 10 (e.g. a hard disk), such programs will be fetched from the server computer 12A via the communication network X and the communication interface 12. The communication interface 12 may not necessarily be of either one of a wired type or a radio type, but may be of the dual type.

The music-playing device 4A may not necessarily be limited to a musical keyboard such as in a keyboard musical instrument, but may be of any type of music-playing mechanism such as in a stringed musical instrument, a wind musical instrument and a percussion musical instrument. Further, the electronic musical apparatus may not necessarily incorporate the music-playing device 4A, the display device 6A and the tone generator circuit 7 within a single main console, but may be configured by connecting those devices which are separately structured using communication means such as a MIDI interface and an appropriate network. Further, the present invention will be applicable not only to an apparatus of a dedicated type handling musical signals such as an electronic musical instrument, a tone generator apparatus, a sequencer, an effector and a mixer, but also to a karaoke apparatus, a game machine and any other apparatuses which are capable of handling musical signals, the apparatus having no backup power source for the internal clock.

Now turning to FIG. 2, a description will be made about the outline of the communication network X to which the electronic musical apparatus is connected to acquire the correct time-of-day information (e.g. a standard time) to be used as the time reference in the apparatus. FIG. 2 is a system block diagram illustrating an example of the overall configuration of a communication network system to which the electronic musical apparatus of FIG. 1 is connected in order to acquire standard time-of-day information from an external standard time server. The communication network X may, of course, contain other devices than those illustrated in FIG. 2, but the invention will be explained with respect to an embodiment with minimal resources with reference to FIG. 2.

The communication network system is comprised of a communication network X such as an LAN (local area network), Internet and a telephone line, on which the above described electronic musical apparatus MS is connected, and further a standard time server TS, a WEB server WS, a client terminal PC, etc. may be further connected according to necessity. Each of the devices (the time server, the WEB server and the client terminal) connectable to the communication network X is constituted by an independent computer incorporating a CPU, a ROM, a RAM, a communication interface, and can communicate with each other on the communication network X to transmit and receive various information.

The standard time server TS is a server computer which provides standard time-of-day information to the electronic musical apparatus MS and the client terminal PC according to a common protocol such as NTP (network time protocol) or SNTP (simple network time protocol) or else. The time server TS is connected with a hardware device such as a GPS clock utilizing a satellite, an ATOM clock utilizing an atomic vibration, a wireless radio wave clock utilizing a wireless radio wave transmission and an ISDN clock. The connected hardware device keeps correct time counting containing information of the standard time of year, month, day, hour and second. Thus, when the electronic musical apparatus MS or the client terminal PC inquires the time-of-day from the standard time server TS, the standard time server TS transmits the standard time-of-day information to the inquiring apparatus. A web server WS is a server computer which provides various display information (texts, images, etc.) or music contents to the electronic musical apparatus or the client terminal PC. Namely, the web server WS stores a number of information files of various kinds and music contents to be delivered, and sends the nominated display information file or the music content file to the inquiring client apparatus according to the inquiry access (e.g. designation of URL (uniform resource locator) from the electronic musical apparatus or the client terminal PC.

The electronic musical apparatus MS accesses a desired time server TS or a desired web server WS via the communication network X, and can acquire the time information from the time server and various display information or music contents from the web server WS. On the other hand, the client terminal PC is a general purpose personal computer, and can be equipped with a music processing function just like the electronic musical apparatus MS by installing some appropriate musical software tool. Generally speaking, however, the client terminal PC has a backup power source, and hence does not correspond to the electronic musical apparatus as featured in the present invention in this context. Anyway, the client terminal PC can also access a desired time server TS or a desired web server WS via the communication network X, and therefore can acquire the time information from the time server or various display information or music content from the web server WS.

In the above described communication network system, the time server TS may not necessarily be an apparatus connected in the wired communication network X. For example, the time server may be a wireless radio wave clock TS' which transmits the time-of-day information on the radio wave. In such a case, the electronic musical apparatus MS includes the communication interface 12 having a radio wave receiver to receive the radio wave of the clock TS', and thus can receive, according to necessity, the time-of-day information transmitted from the radio wave clock TS'.

As the electronic musical apparatus of the present invention is not equipped with a backup power source for the internal clock, the internal clock will stop counting time and lose the time information, and therefore cannot keep the time-of-day counting information correctly, once the apparatus is disconnected from the external power supply such as a power outlet. And when the apparatus is connected again to the external power supply and boots up, the internal clock starts a new from the reset condition and indicates a wrong time, and accordingly is not properly ready for executing various processing that needs the correct time-of-day information. In this connection, the electronic musical apparatus of the present invention will acquire the reference time-of-day information from a given standard time server TS which is connected on the communication network X, and adjust the internal clock based on the acquired time-of-day information and control the internal clock to resume the time-of-day counting operation. Thus, the wrong state of the internal clock caused by the disconnection from the external power supply will be corrected, and the apparatus will now be ready to correctly execute various processing which needs the time-of-day information.

Now herein below, a detailed explanation will be made as to the time-of-day information acquiring processing with reference to FIGS. 3*a*, 3*b* and 3*c*. FIGS. 3*a*, 3*b* and 3*c* are, in combination, a flow chart describing an example of the standard time-of-day information acquiring processing according to the present invention. This processing is initiated when the power is turned on to the electronic musical apparatus, and is terminated when the power is turned off from the electronic musical apparatus. In the illustrated embodiment, the process step of acquiring the time-of-day information from the time-of-day server TS is conducted when the electronic musical apparatus is booted up (i.e. the power is turned on), when a timed content is going to be utilized, when a browser is going to be utilized and when a file is going to be saved. In other words, every time any of such operational events occurs, the process step of acquiring the time-of-day information is conducted in the flow chart shown in FIGS. 3*a*, 3*b* and 3*c*. Needless to say, the process step of acquiring the time-of-day information may also be triggered by other operations than such mentioned events which need time-of-day information as the utilization of a timed content, the utilization of a cookie process in the browser, and the saving of a file. In the drawings, the processing of acquiring the time-of-day information is shown in three parts in FIGS. 3a, 3b and 3c due to the sheet size limitation.

FIG. 3a covers the processing from the boot-up (power-on) of the apparatus through to the utilization of a timed content. First, upon boot-up of the apparatus, the apparatus inquires the time-of-day information from the standard time server TS via the communication network X at a step S1. In the case of the time server TS on the communication network X, the apparatus memorizes the URL of the time server TS beforehand or the user sets the URL to make an access to the time server TS. In the case of the time server TS' of a radio wave clock type, the apparatus receives the radio wave of the carrier frequency of the time server broadcast. Then, a step S2 judges whether the time-of-day acquisition from the time server TS (or TS') was successful. If the judgment is negative (NO), the process flow skips the timer correction steps and jumps to a step S5 for the timed content utilization processing. Possible causes of failure in the acquisition may be that the hardware communication interface 12 is not connected to the main configuration of the electronic musical apparatus, that the necessary settings are not completed or erroneously made in the apparatus with the software operations for the communication connection to receive and transmit information via the communication network X, that the object time server TS is not at work, that there is some trouble in the communication network X per se, that the radio wave condition (air condition) is not stable, and so forth. On the other hand, if the judgment is affirmative (YES), the process flow moves forward to a step S3 to set the time-of-day counting on the timer unit TMU which is the internal clock device based on the acquired time-of-day information, and then to a step S4 to start the TMU counting time. Thus, the internal clock is adjusted to the correct time of day based on the acquired time-of-day information from the time server TS.

To begin with the processing to utilize a timed content, a step S5 judges whether a timed content is going to be used in the apparatus. The term "timed content" in this specification means a software content which is accompanied with a length of time within which the content may be utilized (available time limit) in order to limit the utilization time of the content by comparing the permitted available time limit with the lapse of actual utilization time in the apparatus counted by the internal clock. The available (or permitted) time limit is given, for example, as "cumulatively ten hours." Such timed contents include, but not limited to, a tone content for producing (or playing back) music pieces and/or voices, an image content for displaying pictures on the display device 6A, a composite content combining a tone content and an image content relating to a same music piece, and a practice content using music pieces, voices, images, etc. to be used in practicing or training in playing a musical instrument. The timed contents are stored in a storage device such as the external storage 10 inherently or after received via the communication network X. When the utilization of such a timed content is not commanded in the apparatus, the judgment at the step S5 is negative (NO), and the process flow jumps to a step S11 (FIG. 3b). When the utilization of a timed content is commanded in the apparatus, the judgment at the step S5 turns out to be affirmative (YES), and the process flow goes forward to a step S6 to judge whether the timer unit TMU is running. If the timer unit TMU is not running, the judgment at the step S6 will be negative (NO), which means that the acquisition of the time-of-day information was not successful and accordingly the timer unit has not been started correctly, and the process flow goes to a step S9 to acquire the time-of-day information from the time server TS as at the step S1 above. Then, if the acquisition of the time-of-day information at the step S9 turns out to be unsuccessful, the process flow moves forward to a step S10 in which the display device 6A will exhibit a message that the apparatus is not ready for utilizing a timed content or the sound system 9 will utter a warning sound to notify the user that the intended timed content cannot be utilized any more.

If the timer unit TMU is running, the judgment at the step S6 will be affirmative (YES), and the process flow goes to a step S7 to judge whether the lapse of utilization time of the intended timed content is still within the available time limit. If the acquisition of the time-of-day information at the step S9 turns out to be successful, the process flow goes also to the step S7 for the same judgment. Where the utilization time is within the available time limit, the step S7 judges affirmative (YES), the process flow goes forward to a step S8 to utilize the intended timed content of playing back music or displaying messages or pictures by controlling associated software operations necessary for the content utilization. If the utilization time has already reached the available time limit for the intended timed content, the step S7 judges negative (NO), and the process flow goes to the step S10 to notify the user that the intended timed content cannot be used.

Next, the process flow goes to the processing to utilize a browser, which processing is covered by FIG. 3b. First, the step S11 judges whether a browser (browsing software) is going to be utilized to exhibit various information according to various display information. If the judgment at the step S11 is affirmative (YES), the process goes forward to a step S12 in which the apparatus accesses an intended web server WS connected on the communication network X to acquire various display information including text data and image data. Then at a step S13, the apparatus acquires from the web server WS a cookie file which is stored in the web server WS and retains the same in the electronic musical apparatus. The "cookie" is data of a file format and includes information relating to its available time limit, for example, "available until 2004-12-05 24:00" (i.e. 12:00 midnight of Dec. 5, 2004 in the U.S. fashion). Next, a step S14 judges whether the apparatus receives from the web server WS a request to transmit the cookie retained in the apparatus to the web server WS. If the apparatus has received a request for the cookie from the web server, a step S14 judges affirmative (YES), and the process flow goes to a step S15 to judge whether the timer unit TMU is running. When the timer unit TMU is not running, the process flow goes to a step S18 to acquire the time-of-day information from the time server TS connected on the communication network X. If the acquisition of the time-of-day information from the time server TS is unsuccessful, the process flow jumps to a step S20 (FIG. 3c) without conducting the cookie processing of the browser.

If the timer unit TMU is running, the judgment at the step S15 will be affirmative (YES), and the process flow goes forward to a step S16 to judge whether the present time is within the available time limit of the cookie retained in the apparatus. The judgment is made by comparing the present time of the internal clock with the available time limit of the cookie file. If the acquisition of the time-of-day information at the step S18 turns out to be successful, the internal clock is corrected by the acquired time-of-day information, and then the process flow also goes to the step S16 for the same judgment. Where the present time is before the deadline, i.e. within the available time limit, the step S16 judges affirmative (YES), and the process flow goes forward to a step S17 to transmit the retained cookie to the web server WS. If the present time is beyond the available time limit of the cookie file, the step S16 judges negative (NO), and the process flow goes to a step S19 to delete the cookie file retained in the apparatus.

Next, the process flow goes to the processing to save a file, which processing is covered by FIG. 3*c*. First, a step S20 judges whether the processing to save a file is commanded. If the judgment at the step S20 is negative (NO), the process flow skips the processing steps for the file saving and goes back to another kind of processing (in this embodiment, the timed content utilization processing). If the judgment at the step S20 is affirmative (YES), the process flow goes into the file saving processing. The processing to save a file typically needs a time stamp among others to be affixed to the file name for storing into a hard disk or the like. For this purpose, the correct reference time-of-day information is necessary. In this connection, the timer unit should be running with correct time-of-day information, when a file is going to be saved. Thus, a step S21 judges whether the timer unit TMU is running. If the judgment at the step S21 is negative (NO), the process flow goes to a step S23 to acquire the time-of-day information from the time server TS. If the acquisition of the time-of-day information is unsuccessful, the process flow steps forward to a step S24 to inevitably affix a default time stamp to the file before saving in the storage device. As such a default time stamp, a time which is by far before the present time, for example, "1900-01-01 00:00" (i.e. 00:00 of Jan. 1, 1900 in the U.S. fashion) will be preferred. The term "file" may cover any type of data sets such as an automatic music performance data set and a user specific tone color data set, as long as they can be used and edited on the electronic musical apparatus according to the present invention.

When the step S21 judges affirmative (YES) or when the step S23 acquires the time-of-day information successfully, the time-of-day counting of the internal clock as corrected by the externally acquired (now or before) time-of-day information will be affixed to the file as its time stamp before saving in the storage device. When the power of the electronic musical apparatus is turned off (not shown in the drawings), the whole flow of the above processing is terminated, an the timer unit stops counting time and loses the time-of-day information.

As will be apparent from the above detailed description, according to the present invention, the electronic musical apparatus acquires time-of-day information from an external time server upon boot-up of the apparatus and the internal clock is corrected in its counting time-of-day based on the acquired time-of-day information. Further, in the processing of utilizing a timed content, or utilizing a browser, or saving a file, or else, which needs the time-of-day information, the standard time-of-day information will be acquired from an external time server, every time such processing as needs the time-of-day information is conducted, even though the internal clock might not be corrected at the time of the boot-up of the apparatus due to failure in acquiring the time-of-day information externally for some reasons. By this arrangement, the electronic musical apparatus of the present invention is capable of executing processing which needs time-of-day information, even though the apparatus is not equipped with a backup power source for the internal clock.

In addition, the apparatus is so configured that the user can appropriately input and set the time-of-day for the internal clock according to necessity in the case where the acquisition of the time-of-day information from an external time server was unsuccessful. For the purpose of the processing which does not require a strict time administration as in the case of saving a file, such a user-set time-of-day may be employed. However, for the processing which requires a strict time administration such as utilizing a timed content and using a cookie file, such a user-set time-of-day information would not be adequate. For such latter uses, employment of user-set time-of-day information may preferably be prohibited, or setting of time-of-day by the user may be made unacceptable, or a user-set time-of-day may be made unusable, by providing specific associated program instructions.

While particular embodiments of the invention and particular modifications have been described, it should be expressly understood by those skilled in the art that various modifications and substitutions may be made without departing from the spirit of the present invention so that the invention is not limited thereto, since further modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. An electronic musical apparatus of a type which boots up when a power is supplied and shuts down when the power is removed, said apparatus comprising:

an internal clock which is not backed up by an uninterruptible power supply and stops counting time when a power supply to the apparatus is shut down;

a time information acquiring device which externally acquires time-of-day clock counting information upon boot of the apparatus or prior to execution of processing which needs a reference time-of-day clock counting;

a judging device that judges whether the time information acquiring device successfully acquires the time-of-day clock counting information;

a clock correcting device which corrects said internal clock to run with a time-of-day counting based on the externally acquired time-of-day clock counting information if the judging device judges that the time-of-day information has been successfully acquired and based on a predetermined default time-of-day or user-set time-of-day set by a user if the judging device judges that the external time-of-day clock counting information acquisition has been unsuccessful; and a process executing device which executes the processing which needs a reference time-of-day clock counting according to the time-of-day counting of said internal clock as corrected by said clock correcting device.

2. An apparatus as claimed in claim 1, wherein said time information acquiring device acquires the time-of-day clock counting information from an external time server which transmits a reference time-of-day clock counting via wired or wireless communication.

3. An apparatus as claimed in claim 1, wherein the judging device judges, before said process executing device executes the processing which needs a reference time-of-day clock counting, whether said time information acquiring device has successfully acquired the time-of-day clock counting information.

4. An apparatus as claimed in claim 2, wherein the judging device judges, before said process executing device executes the processing which needs a reference time-of-day clock counting, whether said time information acquiring device has successfully acquired the time-of-day clock counting information.

5. An apparatus as claimed in claim 1, wherein said processing which needs a reference time-of-day clock counting is at least one of utilizing a timed content, utilizing a browser, or saving a file.

6. An apparatus as claimed in claim 1, further comprising:

a storing device which stores a content to be utilized by the apparatus, wherein said process executing device utilizes said content as stored in said storing device, along with said internal clock counting.

7. An apparatus as claimed in claim 6, wherein said content is a timed content.

8. An apparatus as claimed in claim 1, further comprising:

a storing device which stores a browsing program, wherein said process executing device executes said browsing program as stored in said storing device, along with said internal clock, to acquire timed data having a time limit of use via a communication network.

9. An apparatus as claimed in claim 8, wherein said process executing device compares the time-of-day counting of said internal clock with the time limit of data acquired via the communication network while said browsing program is being executed, and processes said timed data in accordance with the result of said comparison while said browsing program is being executed.

10. An apparatus as claimed in claim 1, wherein said process executing device saves a file with a time-of-day stamp affixed to said file, the time-of-day being indicated by said internal clock counting.

11. An apparatus as claimed in claim 1, wherein the processing which needs a reference time-of-day clock counting includes a first process and a second process, and wherein the process executing device executes the second process according to the time-of-day counting of the corrected internal clock but not the first process, if the judging device judges that the external time-of-day clock counting information acquisition has been unsuccessful.

12. A storage medium for use in an electronic musical apparatus having a volatile internal clock, said apparatus being of a data processing type comprising a processor and being connectable to a communication network including a time server, said medium containing a set of executable instructions for causing, upon boot of the apparatus or prior to execution of processing which needs a reference time-of-day clock counting, the processor to perform the steps of:

acquiring time-of-day information externally from the time server through the communication network;

judging whether the time-of-day information has been successfully acquired;

correcting said internal clock to run with a time-of-day counting based on the externally acquired time of day information if the externally acquired time-of-day information has been judged to be successfully acquired from the time server and based on a predetermined default time-of-day or user-set time-of-day set by the user if the external time-of-day information acquisition from the time server has been judged to be unsuccessful; and executing said processing which needs a reference time-of-day clock counting based on the corrected time-of-day counting of said internal clock.

13. A storage medium for use in an electronic musical apparatus having a volatile internal clock, said apparatus being of a data processing type comprising a processor and being connectable to a communication network including a time server, said medium containing a set of executable instructions for causing, at latest prior to execution of processing which needs a reference time-of-day clock counting, the processor to:

acquire time-of-day information externally from the time server through the communication network;

judge whether the time-of-day information has been successfully acquired;

correct said internal clock to run based on the externally acquired time-of-day information if the externally acquired time-of-day information has been judged to be successfully acquired from the time server and based on a predetermined default time-of-day or user-set time-of-day set by a user if the external time-of-day information acquisition from the time server has been judged to be unsuccessful; and execute said processing which needs a reference time-of-day clock counting based on the corrected time-of-day counting of said internal clock.

* * * * *